(12) United States Patent
Lively et al.

(10) Patent No.: US 9,316,123 B2
(45) Date of Patent: Apr. 19, 2016

(54) POWER GENERATION SYSTEM AND PROCESSES THEREOF, INCLUDING ADSORBING HEAT EXCHANGERS FOR CO2 CAPTURE FROM FOSSIL FUEL CONSUMPTION

(75) Inventors: Ryan Paul Lively, Atlanta, GA (US); William John Koros, Atlanta, GA (US); Ron Chance, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 625 days.

(21) Appl. No.: 13/581,234

(22) PCT Filed: Feb. 25, 2011

(86) PCT No.: PCT/US2011/026341
§ 371 (c)(1),
(2), (4) Date: Sep. 7, 2012

(87) PCT Pub. No.: WO2011/106718
PCT Pub. Date: Sep. 1, 2011

(65) Prior Publication Data
US 2012/0324890 A1 Dec. 27, 2012

Related U.S. Application Data

(60) Provisional application No. 61/308,095, filed on Feb. 25, 2010.

(51) Int. Cl.
*F01K 17/06* (2006.01)
*B01D 53/14* (2006.01)

(52) U.S. Cl.
CPC ..................... *F01K 17/06* (2013.01)

(58) Field of Classification Search
CPC ........................................................ F01K 17/06
USPC ................... 60/648, 670, 654, 678, 646, 657; 95/183, 169
See application file for complete search history.

(56) References Cited

U.S. PATENT DOCUMENTS

| | | |
|---|---|---|
| 3,950,957 A | 4/1976 | Zakon |
| 5,520,894 A | 5/1996 | Heesink et al. |
| 6,764,530 B2 | 7/2004 | Iijima |
| 7,022,168 B2 | 4/2006 | Schimkat et al. |

(Continued)

OTHER PUBLICATIONS

International Search Report and Written Opinion dated Jun. 10, 2011 for related PCT Patent Application No. PCT/US2011/026341.

*Primary Examiner* — Jorge Pereiro
*Assistant Examiner* — Paul Thiede
(74) *Attorney, Agent, or Firm* — Troutman Sanders LLP; Ryan A. Schneider; Troy S. Kleckley

(57) ABSTRACT

The present invention generally relates to power generation systems configured to absorb and capture a component, such as carbon dioxide, in a flue gas for later sequestration or utilization, wherein heat generated in the sorption process is captured for use in the power generation system. In some examples, the heat of sorption is used to preheat fluids in one or more systems of the power generation system to reduce the heating load on the subsystem. By using the heat of sorption, the carbon dioxide capture and sequestration process not only reduces or eliminates the concentration of carbon dioxide in the flue gas, but reduces or eliminates the parasitic effect of carbon dioxide capture and sequestration on power generation.

20 Claims, 9 Drawing Sheets

(56) References Cited

U.S. PATENT DOCUMENTS

2004/0011198 A1  1/2004  Keefer et al.
2007/0256559 A1* 11/2007 Chen et al. ............... 95/169
2008/0127632 A1  6/2008  Finkenrath et al.
2008/0282888 A1 11/2008 Deckman et al.
2009/0117024 A1* 5/2009 Weedon et al. ............ 423/437.1

* cited by examiner

POWER GENERATION SYSTEM AND PROCESSES THEREOF, INCLUDING ADSORBING HEAT EXCHANGERS FOR CO2 CAPTURE FROM FOSSIL FUEL CONSUMPTION

CROSS REFERENCE TO RELATED APPLICATION

This application claims benefit under 35 U.S.C. §119(e) of U.S. Provisional Patent Application No. 61/308,095 filed 25 Feb. 2010, and entitled "Adsorbing Heat Exchangers for CO2 Capture From Fossil Fuel Fired Power Plants", and PCT International Application No. PCT/US2011/026341, filed 25 Feb. 2011, and entitled "Adsorbing Heat Exchangers," which are incorporated by reference as if set forth herein in their entirety.

TECHNICAL FIELD

The present system relates generally to gas-component capture systems.

BACKGROUND

Gaseous components, such as carbon dioxide, are produced through the combustion of all carbon containing fuels, including coal. Carbon capture and sequestration from large point sources is a lead strategy for lowering anthropogenic carbon dioxide emissions and possibly reducing climate change risk. Carbon dioxide capture and sequestration is the process by which carbon dioxide, a greenhouse gas, is removed from an exhaust or output stream and deposited into a reservoir or some other type of storage unit, and thus removed from entering the atmosphere. The diverted carbon dioxide can also be used in a secondary system that utilizes carbon dioxide, such as a biomass or biofuel production facility. By some accounts, the largest point sources of carbon dioxide are coal-fired plants. The combustion of brown coal to generate energy can emit more than three times as much carbon dioxide as other carbon fuels, such as natural gas. Black coal emits almost two times as much carbon dioxide per unit of electricity than other electrical power generation technologies.

BRIEF SUMMARY OF THE DISCLOSURE

Briefly described, various embodiments of the present invention are directed to a power generation system capable of carbon dioxide capture from a flue gas, wherein the sorption process heat is captured for use in the power generation system. The heat of sorption is used to preheat fluids in one or more subsystems of the power generation system to reduce the heating load on the subsystem. By using the heat of sorption, the carbon dioxide capture system not only reduces or eliminates the concentration of carbon dioxide in the flue gas, but also reduces or eliminates the parasitic effect of carbon dioxide capture and sequestration.

The present invention can use various types of sorption means, including, but not limited to, hollow fiber sorbents and aqueous ammonia sorption systems. Additionally, the present invention can utilize more than one sorption system or subsystem to maintain the sorption process. The sorption systems can include one sorption subsystem that is online to sorb carbon dioxide from flue gas, one sorption subsystem in desorption mode to remove the carbon dioxide from the sorbent, and one sorption subsystem in standby to be placed online.

In an exemplary embodiment, the present invention is a fossil fuel power generation system comprising a boiler utilizing the heat of combustion of the fossil fuel to turn liquid water into steam at a heighted temperature and pressure, a turbine that receives the steam from the boiler and extracts energy of the steam to convert the rotational motion of the turbine into electrical energy, a condenser to receive the exhaust steam from the turbine and convert the steam into water, and a carbon dioxide capture system capturing the carbon dioxide in the exhaust gas generated by the combustion. The carbon dioxide capture heat is used to preheat one or more fluid streams of the power generation system. In an exemplary embodiment of the present invention, the heat produced by the carbon dioxide capture system is used to preheat a feedwater stream that provides liquid water to the boiler. In another exemplary embodiment of the present invention, the carbon dioxide capture system uses a matrix of fiber sorbents to remove at least a portion of the carbon dioxide from the exhaust gas.

In another exemplary embodiment of the present invention, the carbon dioxide capture system comprises a plurality of carbon dioxide capture subsystems, each one of the plurality of carbon dioxide capture subsystems removing at least a portion of the carbon dioxide from the exhaust gas. In one configuration, there are two carbon dioxide capture subsystems. One carbon dioxide capture subsystem is placed online to capture carbon dioxide gas, and the other carbon dioxide capture subsystem is in a desorption mode. In another configuration, a third carbon dioxide capture subsystem is provided wherein one carbon dioxide capture subsystem is placed online to capture carbon dioxide gas, a second carbon dioxide capture subsystem is in a desorption mode, and the third carbon dioxide capture subsystem is in a standby mode.

In a further exemplary embodiment of the present invention, a heat exchanger is disclosed for use in a fossil fuel energy production system. The heat exchanger comprises a volume of carbon dioxide sorbing materials that can adsorb and desorb carbon dioxide. The heat exchanger receives an input flue stream containing carbon dioxide, the flue stream being the exhaust gas of a fossil fuel combustion chamber, and an input stream of preheated feedwater to be sent to a boiler to generate steam. The heat exchanger transfers the heat generated from the sorption of carbon dioxide from the flue gas to the input stream of liquid from the exhaust stream of a combustion chamber. The heat exchanger receives the input stream of feedwater and transfer the heat of sorption to the input stream of feedwater to provide the preheated feedwater stream.

The foregoing summarizes beneficial aspects of the present invention but is not intended to be reflective of the full scope of the present invention as claimed. Additional features and advantages of the present invention are set forth in the following description, are apparent from the description, or are learned by practicing the present invention. Moreover, the foregoing summary and following detailed description are exemplary and explanatory, and are intended to provide further explanation of the present invention as claimed.

BRIEF DESCRIPTION OF THE DRAWINGS

The accompanying drawings, which are incorporated in and constitute a part of this specification, illustrate multiple exemplary embodiments of the present invention and, together with the description, serve to explain the principles of the present invention. They are not intended in any manner to limit the scope of the present invention. Headings provided herein are for convenience only and do not necessarily affect the scope or meaning of the claimed invention.

DETAILED DESCRIPTION

Figure 1:
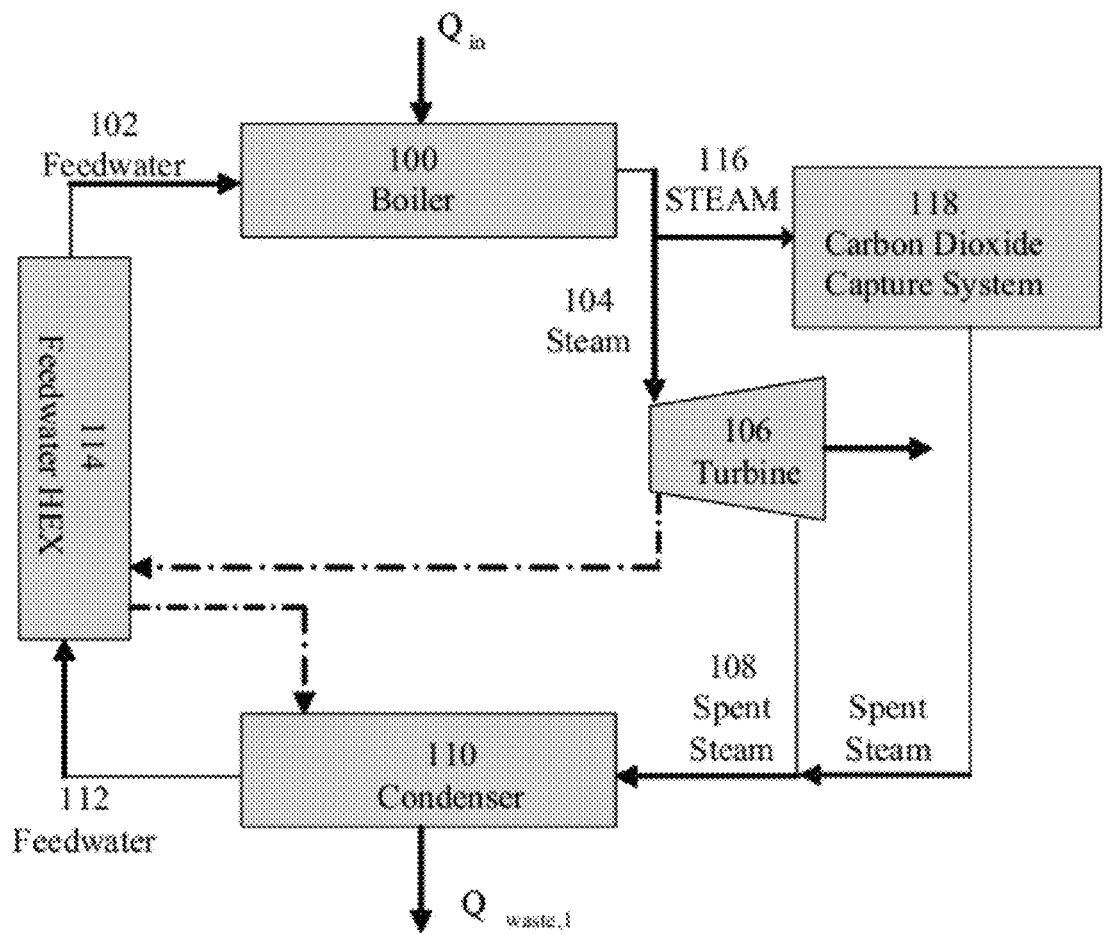
FIG. 1 illustrates a prior art fossil fuel power generation plant.

The subject matter of the various embodiments is described with specificity to meet statutory requirements. However, the description itself is not intended to limit the scope of the claimed invention. Rather, it has been contemplated that the claimed invention can be embodied in other ways, to include different steps or elements similar to the ones described in this document, in conjunction with other present or future technologies. Although the term "step" can be used herein to connote different aspects of methods employed, the term should not be interpreted as implying any particular order among or between various steps herein disclosed unless and except when the order of individual steps is explicitly required. The following description is illustrative and non-limiting to any one aspect.

It should also be noted that, as used in the specification and the claims, the singular forms "a," "an" and "the" include plural references unless the context clearly dictates otherwise. For example, reference to a component is intended to also include composition of a plurality of components. References to a composition containing "a" constituent are intended to include other constituents in addition to the one named. Also, in describing preferred embodiments, terminology will be resorted to for the sake of clarity. It is intended that each term contemplates its broadest meaning as understood by those skilled in the art and includes all technical equivalents which operate in a similar manner to accomplish a similar purpose.

Ranges may be expressed herein as from "about" or "approximately" one particular value and/or to "about" or "approximately" another particular value. When such a range is expressed, other exemplary embodiments include from the one particular value and/or to the other particular value. The terms "comprising" or "containing" or "including" mean that at least the named component, element, particle, or method step is present in the system or article or method, but does not exclude the presence of other components, materials, particles, or method steps, even if the other such components, material, particles, and method steps have the same function as what is named.

It is also to be understood that the mention of one or more method steps does not preclude the presence of additional method steps or intervening method steps between those steps expressly identified. Similarly, it is also to be understood that the mention of one or more components in a system or composition does not preclude the presence of additional components than those expressly identified. To facilitate an understanding of the principles and features of the present invention, embodiments are explained hereinafter with reference to implementation in illustrative embodiments.

With recent advances in the measurement and monitoring of climate change caused by greenhouse gases, there is increasing attention paid to the introduction of greenhouse gases into the atmosphere. Carbon dioxide has long been recognized as a greenhouse gas, contributing to the effects of climate change. Coal and other fossil fuel burning energy plants are large point sources for the introduction of greenhouse gases into the atmosphere. As previously discussed, carbon dioxide is produced when carbon-containing fuels are combusted. In conventional fossil fuel energy plants, carbon dioxide capture and sequestration systems are installed at the outlet of the boiler, e.g. the combustion unit.

FIG. 1 illustrates a conventional fossil fuel energy production plant configuration. A boiler 100 receives as a heat input $Q_{in}$ the heat of combustion of a fossil fuel, for example, and not by way of limitation, coal. It should be understood that the present invention is not limited to coal as the fossil fuel, but rather, may include other types of fossil fuels such as natural gas. Additionally, it should be understood that the present invention is not limited to power generation plants, but rather, may also be incorporated into systems in which the heat of sorption of carbon dioxide may be used to preheat a fluid.

The heat input $Q_{in}$ heats and vaporizes feedwater input stream 102 to produce high pressure, high temperature steam 104. The steam 104 is fed to a turbine 106, which rotates blades (not shown) of turbine 106, which in turns rotates an electrical power generation unit such as an AC generator. A secondary steam output 116 from boiler 100 is sent to carbon dioxide capture system 118, which sorbs at least a portion of the carbon dioxide in steam output 116. Once captured, the carbon dioxide is sequestered, i.e. stored. The spent steam from the carbon dioxide capture system and from turbine 106 is combined as spent steam 108, and sent to a condenser 110 that cools the steam to condense the steam to feedwater 112. Feedwater 112 is fed to feedwater heat exchanger 114 for use as input feedwater 102.

In current art systems that capture carbon dioxide, there are typically two main losses of energy from the system (not including frictional losses and loss of heat to the environment due to imperfect insulation). The first loss of energy is the waste heat from the condenser 110. In power generation systems, turbine 106 does not fully extract all the energy from steam 104. The amount of cooling necessary in condenser 110 to cool and condense spent steam 108 to become feedwater 112 is represented by $Q_{waste,1}$.

Another main source of energy loss is the energy of sorption in carbon dioxide capture system 118. During the sorption process, heat of enthalpy of sorption is generated as the carbon dioxide sorbs, either through absorption or adsorption, in a sorption media (or material). This heat must be accounted for in the overall energy balance, and thus, represents a parasitic load placed on boiler 100. The amount of heat added to the system, represented by $Q_{in}$, necessarily must to be increased to compensate for the loss of heat in carbon dioxide capture system 118.

The present invention reduces the parasitic nature of a carbon dioxide capture system by integrating the heat of enthalpy of sorption into the power generation system. It should be noted that carbon dioxide is the component to be removed for purposes of illustration only. Other undesirable components or gases to be sorbed may by sorbed according to various embodiments of the present invention, all being within the scope of this invention.

Figure 2:
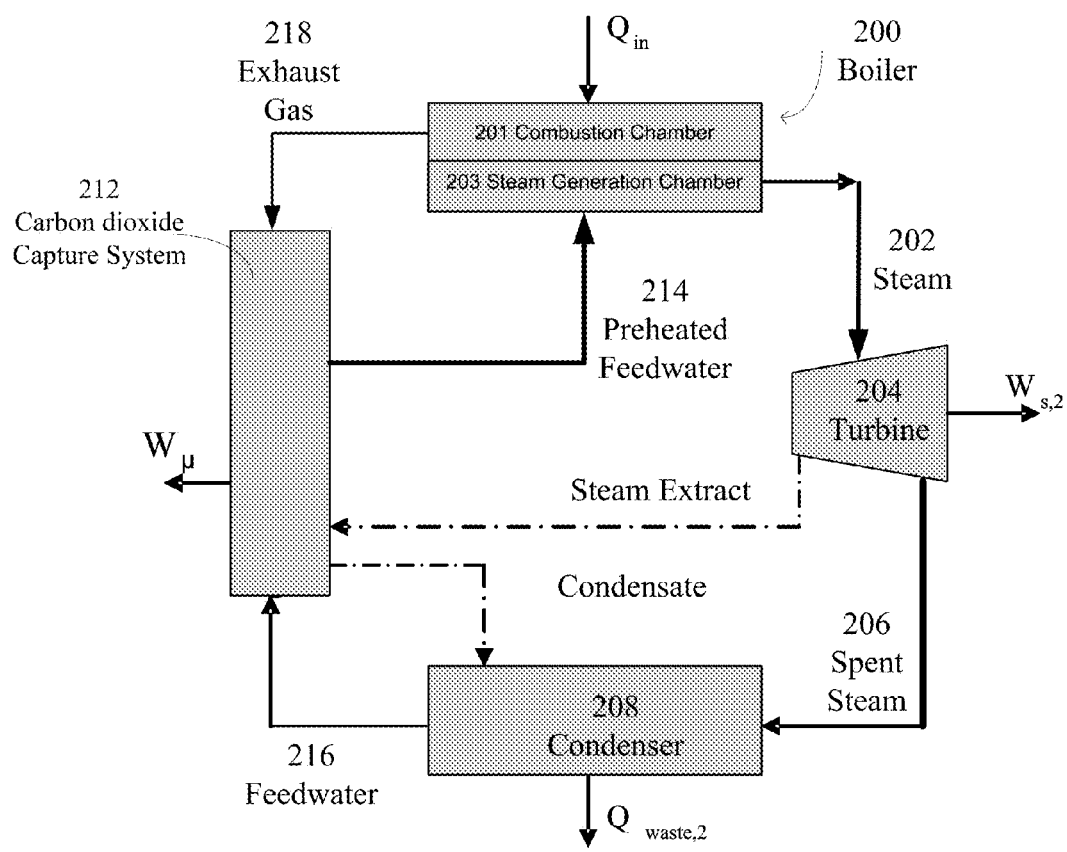
FIG. 2 illustrates a fossil fuel power generation plant according to an exemplary embodiment of the present invention.

FIG. 2 illustrates an exemplary fossil fuel power generation plant that integrates a carbon dioxide capture system into the heat cycle, reducing or eliminating the parasitic nature of carbon dioxide capture. As with the power generation system of FIG. 1, the power generation system of FIG. 2 has a boiler 200 receiving as heat input the combustion heat from burning a fossil fuel $Q_{in}$ and applying that heat input to water in boiler 200 to turn the water to steam 202 having a first temperature and a first pressure. FIG. 2 depicts boiler 200 as comprising a combustion chamber 201 and a steam generation chamber 203. In typical power plants, the first temperature and pressure are significantly elevated above standard temperature and pressure (STP). The steam 202 exhausted from boiler 200 is transferred to turbine 204 for the generation of electricity. The spent steam 206 coming from turbine 204, now at a lower second temperature and second pressure than the first temperature and first pressure, is sent to condenser 208 for condensing the spent steam 206 into feedwater 216 at a third temperature and pressure that is lower than the second temperature and second pressure. Feedwater 216 is thereafter sent to carbon dioxide capture system 212.

Carbon dioxide capture system 212 receives as an input the cooled feedwater 216 and exhaust gas 218. Exhaust gas 218, sometimes referred to as flue gas, is the gas produced upon combustion of a fossil fuel. At least a portion, if not a significant majority, of exhaust gas 218 is carbon dioxide. In some types of combustion processes, exhaust gas 218 can be primarily carbon dioxide. Carbon dioxide capture system 212 has a volume containing one or more sorbing media. Various types of sorbing media can be used including, but not limited to, zeolite in various forms, chilled ammonia, and one or more liquid amines.

In the manner of a typical heat exchanger, exhaust gas 218 is introduced into one side of carbon dioxide capture system, and feedwater 216 is introduced into the other side. Heat is generated when carbon dioxide is sorbed by sorption media of carbon dioxide capture system 212. At least a portion of that heat is transferred to the feedwater 216, the process of which is described in more detail in FIG. 3, thus providing a preheating effect to produce preheated feedwater 214 at a fourth temperature which is a higher temperature than feedwater 216 at the third temperature.

The preheating of preheated feedwater 214 helps reduce the heat load on boiler 200, reducing the amount of heat necessary to boil the water in boiler 200 when a power plant captures carbon dioxide from exhaust gas 218. As can be seen when compared to the power generation system of FIG. 1, the heat of enthalpy caused by the sorption process is recycled and reused in the power generation heat cycle. By preheating preheated feedwater 214 from the lower third temperature to the higher fourth temperature, the amount of energy required for converting preheated feedwater 214 to steam is reduced as the incoming temperature of the preheated feedwater 214, i.e. fourth temperature, to the boiler 200 can be closer to the boiling point of water. In the prior art systems, as represented by FIG. 1, the heat of enthalpy is a drain or parasitic loss which must be compensated for by the heat input to the boiler 100 of FIG. 1.

Carbon dioxide capture system 212 comprises typical sorption media. The carbon dioxide in exhaust gas 218 is absorbed or adsorbed into the sorption material. After a period of use, the sorption material becomes partially or substantially saturated with carbon dioxide and will not appreciable sorb any additional carbon dioxide. At this point, in order to sorb more carbon dioxide, carbon dioxide capture system 212 causes the carbon dioxide originally sorbed to be desorbed from the sorption material. In typical sorption technologies, this involves the addition of heat to the sorption material. In the system of FIG. 2, the additional heat is provided by drawing a small amount of steam, "steam extract", from turbine 204. This high temperature "steam extract" heats the sorption material, causing desorption of carbon dioxide. The heat transferred from the "steam extract" to the sorption material will cause some or all of the "steam extract" to cool and condense, which is sent to condenser 208 as "condensate".

After a period of time, carbon dioxide in the sorption material will be desorbed or substantially desorbed. In order for carbon dioxide capture system 212 to be brought back online, the temperature of the sorption material is lowered, either by introducing a coolant stream into carbon dioxide capture system 212 or by allowing carbon dioxide capture system 212 to air cool. There are various ways to cool the sorption material or heat the sorption material, all of which are considered to be within the scope of the present invention.

Figure 3:
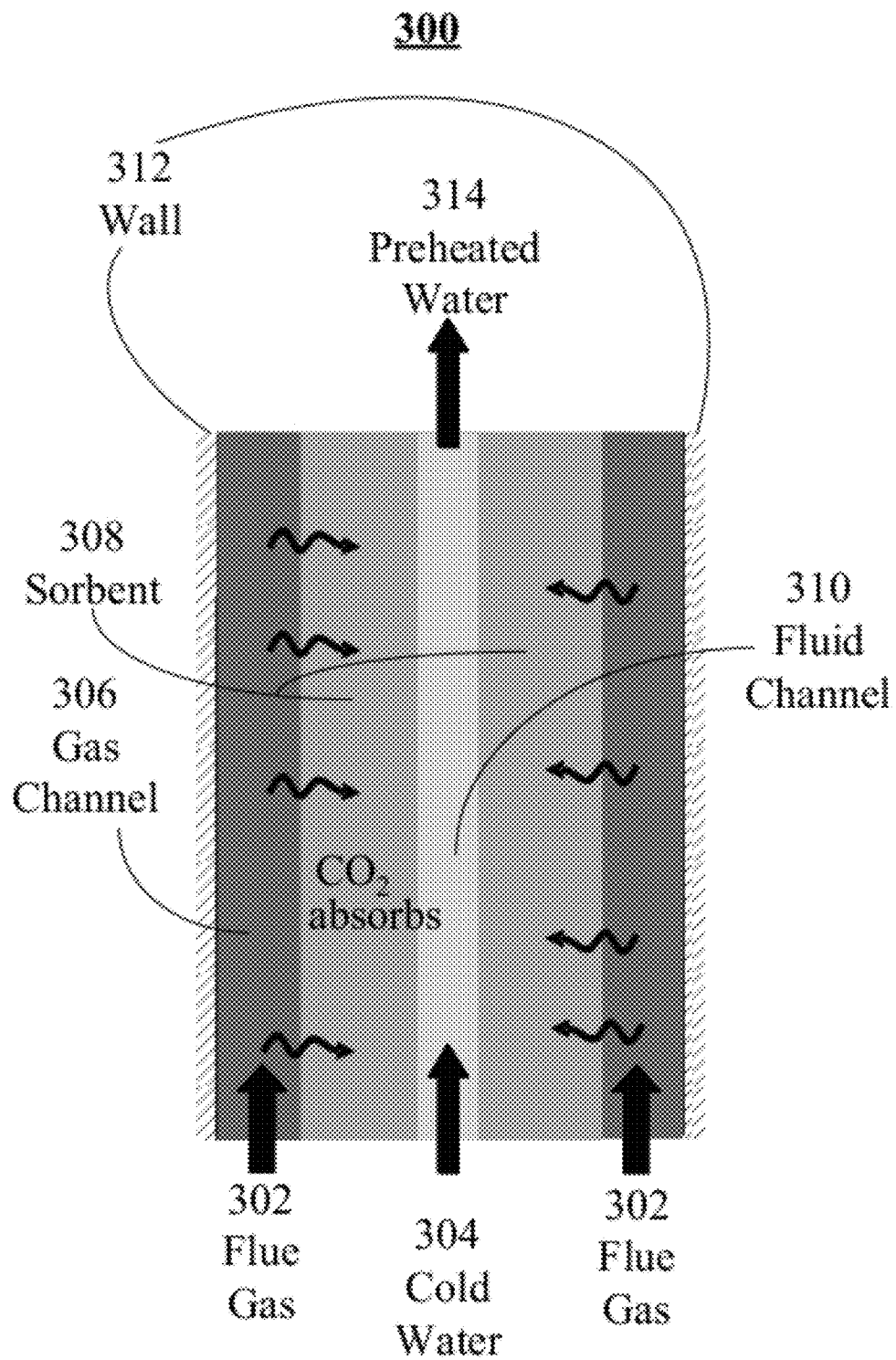
FIG. 3 illustrates a hollow fiber adsorber in the sorption cycle according to an exemplary embodiment of the present invention.

As discussed above, various types of sorbent media or materials can be used. For purposes of the present invention and the following description, the sorbent favored is a hollow fiber absorbent using zeolite as the sorbent material. It should be noted that the present invention is not limited to a hollow fiber absorbent or the use of zeolite, which are being used for purposes of description only. FIG. 3 is an exemplary sorption unit 300 that uses a hollow fiber sorbent. Sorption unit 300 is configured to receive flue gas 302 as one input. Flue gas 302 is an exhaust stream comprising the exhaust gases from a combustion chamber, such as one that can be used in conjunction with boiler 200 of FIG. 2. Flue gas 302 has a concentration of carbon dioxide that is intended to be removed from flue gas 302. Flue gas 302 flows over sorbent 308 in gas channels 306. Gas channels 306 can have various configurations. For example, gas channel 306 can be the area separating one sorption unit 300, which in FIG. 3 is a hollow fiber zeolite tube, from another sorption unit 300. In some embodiments, there are a plurality of sorption units 300 having a volume contained in a carbon dioxide capture subsystem, the boundaries of which are represented generically by wall 312.

Sorbent 300 receives the flue gas 302 and, through the process of sorption, which in this case is adsorption because zeolite is the sorbent material, heat is released. This heat, the heat of enthalpy of sorption, is transferred to cold water 304, which can be the feedwater 216 of FIG. 2, to increase the temperature of cold water 304 to heat cold water 304. After cold water 304 is heated, cold water 304 exits sorption unit 300 as preheated water 314. In some embodiments, preheated water 314 is preheated feedwater 214 of FIG. 2.

Figure 4:
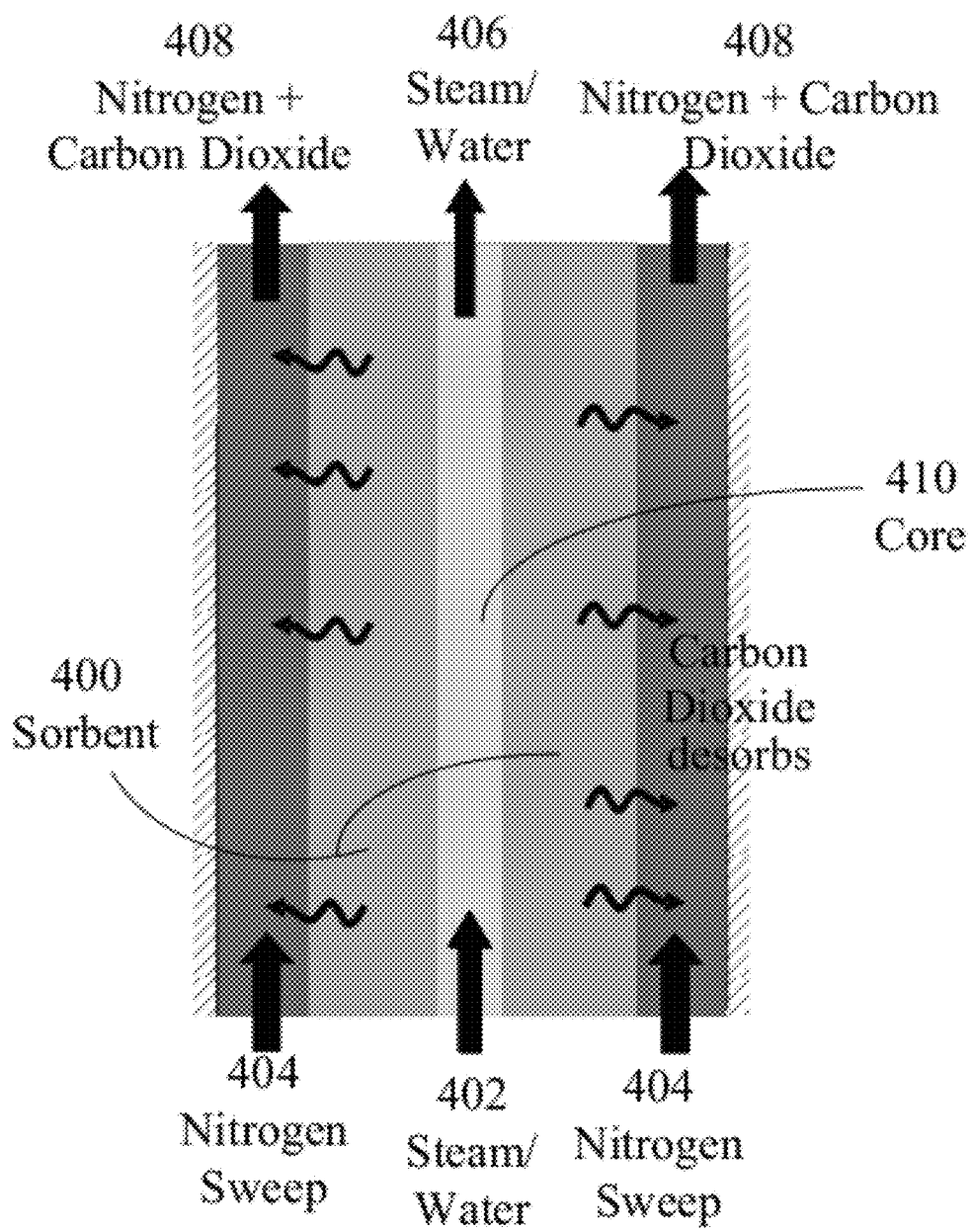
FIG. 4 illustrates a hollow fiber adsorber in the desorption cycle according to an exemplary embodiment of the present invention.

As discussed above, after a period of adsorbing carbon dioxide, a sorbent material eventually becomes saturated to the point that efficient carbon dioxide capture, e.g. during the online mode, no longer occurs. In order to place the sorbent material in a condition for sorption, the previously captured carbon dioxide needs to be desorbed in a desorption mode and removed. FIG. 4 is an illustration showing sorption unit 420 in the desorption mode. Sorption unit 420 uses sorbent 400, in this embodiment, zeolite. Sorbent 400 becomes saturated or partially saturated with carbon dioxide captured during an online mode use of sorption unit 420. In order to continue to capture carbon dioxide, it is beneficial to remove at least a portion of the previously captured carbon dioxide. It should be noted that saturation of the sorbent 400 is not necessarily a prerequisite for entering the desorption mode. For example, various performance characteristics of sorbent 400 can require that sorbent 400 be configured for desorption mode because of a particular flow rate of a flue gas, a desired efficiency, etc. The present description uses saturation merely as an exemplary condition solely for the purposes of description and not as an intention to limit the scope of the application.

To desorb carbon dioxide from sorbent 400, in some instances, the temperature of sorbent 400 needs to be increased to a particular point for a given time depending on the particular type of sorbent used for sorbent 400. In FIG. 4, steam/water 402 is used to heat sorbent 400. Steam/water 402 can have various sources, and in one embodiment, can be a draw from the hot steam that enters a turbine in a power generation plant, as was described in FIG. 2. Steam/water 402 enters sorbent unit 420 in the hollow center core 410 of a zeolite tube. The heat from steam/water 402 is transferred to sorbent 400 which, when raised to a certain temperature, causes sorbent 400 to desorb the captured carbon dioxide.

The desorbed carbon dioxide is taken up in the $N_2$ gas sweep 404 stream and is exhausted in stream 408, which comprises both carbon dioxide and $N_2$. In some examples the $N_2$ in $N_2$ sweep stream 404 can also be heated to help maintain the temperature of sorbent 400. In other embodiments, different ways of heating sorbent 400 can be used. For example, sorbent unit 420 can have one or more resistive electrical conductors that generate heat when a current is applied. The present invention is not limited to any particular manner in which sorbent 400 can be heated. Additionally, the present invention is not limited to the use of $N_2$ gas as the uptake gas. Other gases, including other inert gases, can be used.

Figure 5:
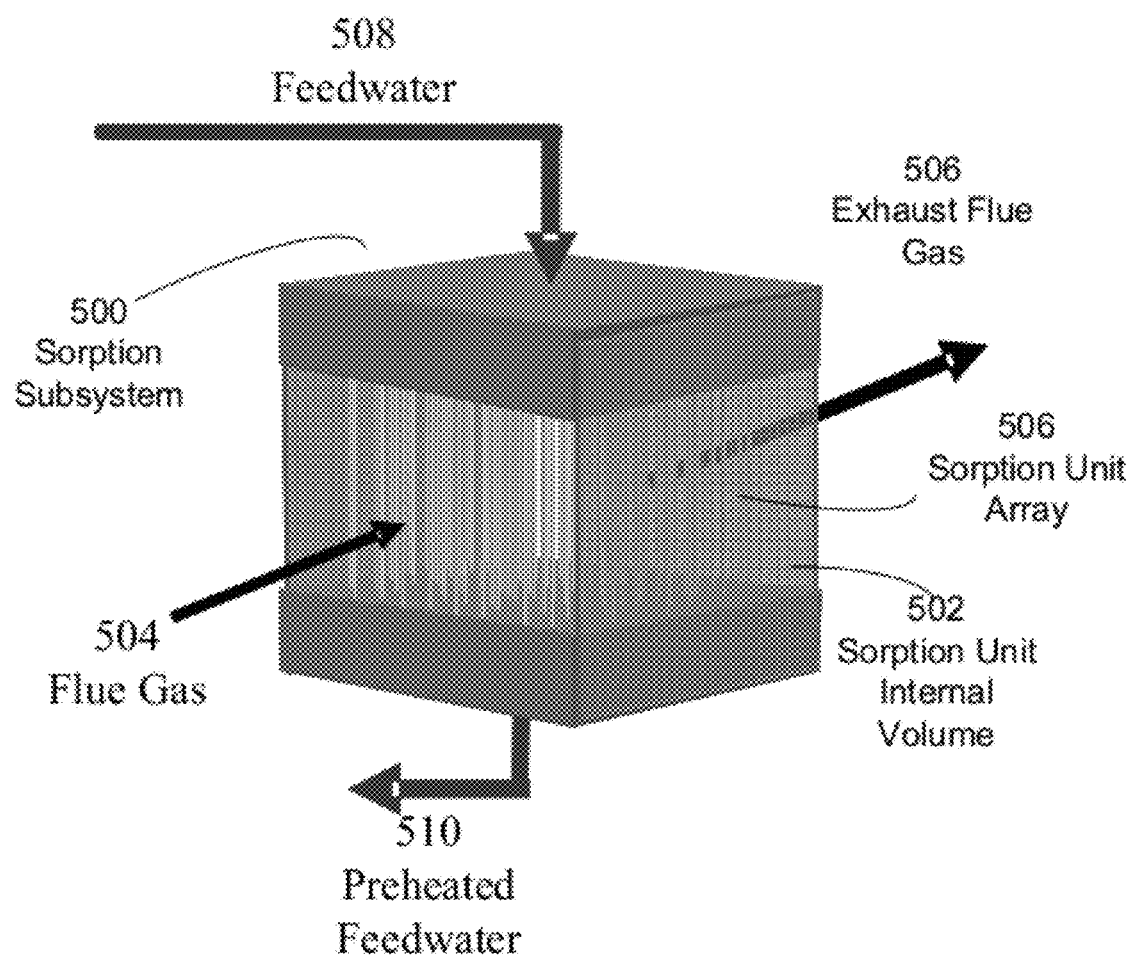
FIG. 5 is a further illustration of the fluid flows in a heat exchanger using hollow fiber adsorbers in the sorption cycle according to an exemplary embodiment of the present invention.

FIG. 5 illustrates a carbon dioxide subsystem according to an exemplary embodiment of the present invention. Further purposes of description only, carbon dioxide capture mechanisms are described in terms of systems and subsystems. The term system is meant to describe one or more subsystems that provide the carbon dioxide capture/preheating function of the present invention, such as carbon dioxide capture system 212 of FIG. 2. Each carbon dioxide capture system can incorporate one or more carbon dioxide capture subsystems, each subsystem capturing carbon dioxide and/or preheat a fluid stream. In the present invention, the term subsystem can also designate a component of another system or subsystem. The present invention is not limited to any particular configuration or designation of carbon capture systems or subsystems.

Referring back to FIG. 5, shown is sorption subsystem 500. Subsystem 500 can either act alone in a power generation system, thus being a system, or can be used in conjunction with one or more of carbon capture subsystems. Subsystem 500 has sorption unit internal volume 502 that represents the enclosed space in which flue gas 504 is introduced. Flue gas 504 can comprise various gases, including carbon dioxide and $N_2$. Flue gas 504 is introduced into volume 502. As the one or more gases in flue gas 504 flows over sorption unit array 506, which comprises of one or more sorption materials (such as hollow fiber zeolite tubes), at least a portion of the carbon dioxide in flue gas 504 is adsorbed by the sorption material in sorption unit array 506. In some embodiments of the present invention, the sorption unit array 506 can have various configurations, including a packed bed arrangement in which a plurality of zeolite containing tubes are "packed" into a volume. Exiting gas is exhausted as exhaust flue gas 506, which preferably has a lower concentration of carbon dioxide than flue gas 504.

As the sorbent material in sorption unit array 506 adsorbs the carbon dioxide in flue gas 504, heat is generated. To recapture and reuse this heat, feedwater 508 is introduced into sorption subsystem 500. Feedwater travels through sorption unit array 506 and receives the heat caused by the adsorption from preheated feedwater 510. As can be appreciated, sorption subsystem 500 can be used in any system in which it would be beneficial to preheat a relatively lower temperature fluid, and is not limited to feedwater to a boiler of a power generation system.

After the sorbent material in a sorption subsystem, such as sorption subsystem 500 of FIG. 5, adsorbs carbon dioxide, it can be beneficial to desorb all or a portion of the captured, e.g. sorbed, carbon dioxide. In order to do so, in an exemplary embodiment of the present invention, the sorbent material is heated. This process was discussed by way of example in FIG. 4. In some instances, it can be desired or necessary to sequester pure carbon dioxide. This means that the gas exhausted as a result of a carbon dioxide desorption cycle can comprise only, or nearly all, carbon dioxide. Introducing $N_2$ gas into a carbon dioxide sequestration unit may contaminate certain carbon dioxide sequestration technologies or may reduce their effectiveness. For example, a carbon dioxide capture technology may use algae growth as the final disposition for the captured carbon dioxide. $N_2$ may reduce the photosynthesis occurring in the algae, and therefore, limit the rate of carbon dioxide utilization.

Figure 6:
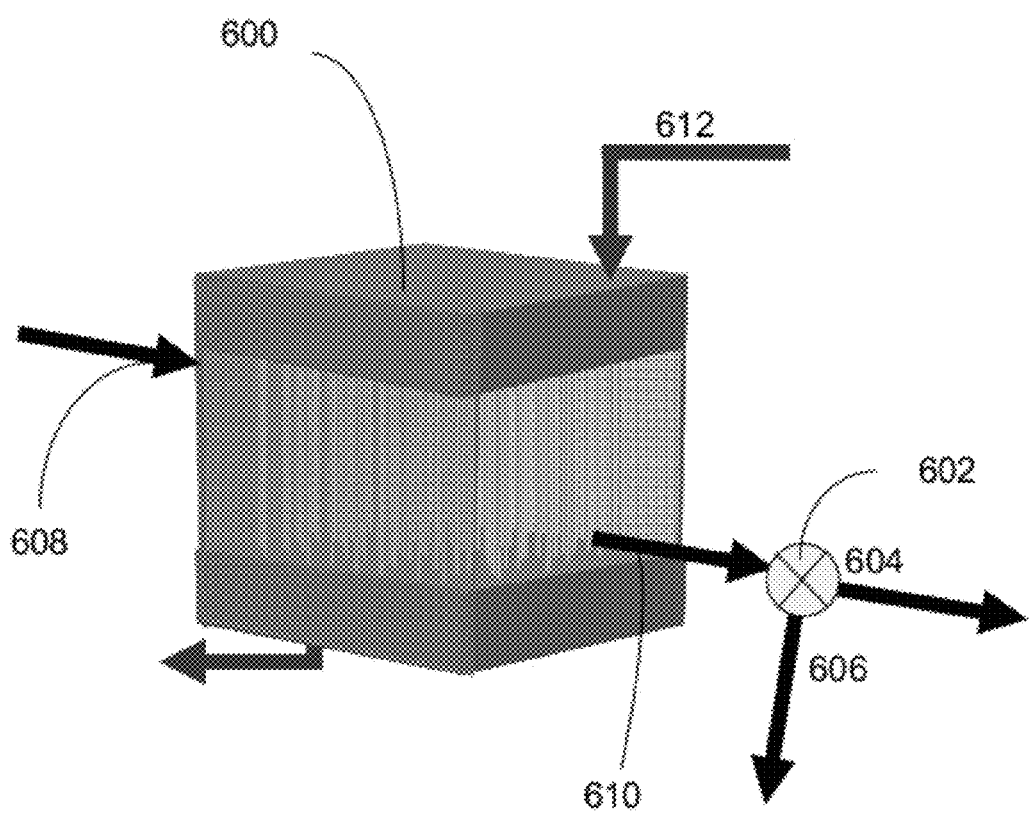
FIG. 6 is a further illustration of the fluid flows in a heat exchanger using hollow fiber adsorbers in the desorption cycle according to an exemplary embodiment of the present invention.

To increase the concentration of carbon dioxide exhausted for sequestration, the present invention utilizes a sequenced system. FIG. 6 is an illustration showing how carbon dioxide desorbed can be sent to a sequestration facility. During an initial gas removal phase, valve 602 of sorption subsystem 600 is turned to a first outlet position 604 that provides as $N_2$ and carbon dioxide gas as an output. In one embodiment of the present invention, $N_2$ gas from inlet 608 is used as a push gas. The $N_2$ gas increases the partial pressure of the internal volume of sorption subsystem 600, which forces or pushes the desorbed carbon dioxide, using hot water 612, contained in sorption subsystem 600 to exhaust 610. By controlling the rate of the introduction of $N_2$ via inlet 608, the initial gas removal phase, which can contain both $N_2$ and carbon dioxide gas, can be shortened so that a second gas removal phase, in which the exhaust gas is primarily carbon dioxide, can be commenced. Valve 602 is moved to a second position 606 to allow pure or nearly pure carbon dioxide to be output from the subsystem 600.

In some embodiments of the present invention, because $N_2$ gas is lighter than carbon dioxide gas, inlet 608 can be placed at a higher elevation than exhaust 608. In certain configurations, having inlet 608 at a higher elevation than exhaust 608 can provide for the collection of $N_2$ gas in the top portions of subsystem 600, providing for lower concentrations of $N_2$ in the exhaust gas, resulting in a higher concentration or purity of carbon dioxide.

Figure 7:
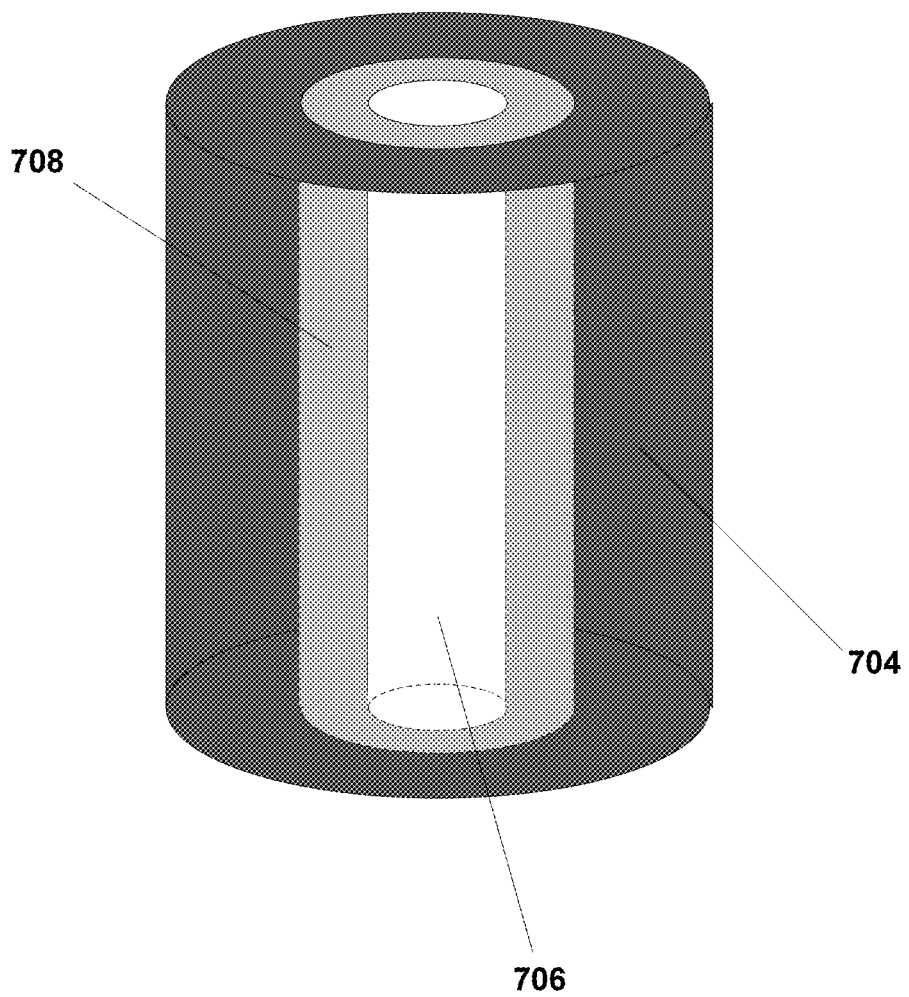
FIG. 7 illustrates an exemplary hollow fiber adsorber according to an exemplary embodiment of the present invention.

A sorbent used according to an embodiment of the present invention has been described as a hollow core zeolite tube. FIG. 7 is an illustration of an exemplary tube 700 that can be used in conjunction with various embodiments of the present invention. Tube 700 has zeolite core 704. Zeolite has a molecular structure that provides for the ability to adsorb and then, when heated, desorb carbon dioxide. In a center axis of zeolite core 704 is hollow void 706. To keep the liquid or fluid in hollow void 706 from entering zeolite core 704, thus possibly contaminating zeolite core 704, impermeable barrier 708 is provided. In some embodiments of the present invention, barrier 708 is a latex or thin, waterproof barrier that lines the walls of hollow void 706.

Barrier 708 in combination with hollow void 706 provide for a fluid channel in which a fluid to be preheated can enter, receive the heat of adsorption caused by the adsorption of carbon dioxide in a flue gas flowing over zeolite core 704, and exit in a preheated condition without contaminating zeolite core 704. The present invention is not limited to any particular manner of manufacturing tube 700. Barrier 708 and the volume of hollow void 706 in relation to zeolite core 704 are based upon various factors, including the heat transfer rate as well as fluid flow rates.

Fluid flow rates are an important consideration when designing a system according to various embodiments of the present invention, one of which is the requirement that carbon dioxide be continually or nearly continually captured. Carbon dioxide capture is not a sustaining process. The sorption material eventually becomes saturated with carbon dioxide to the point that further sorption is inefficient or unable to be achieved. In order to maintain carbon dioxide capture, a plurality of carbon dioxide capture subsystems can be used.

Figure 8:
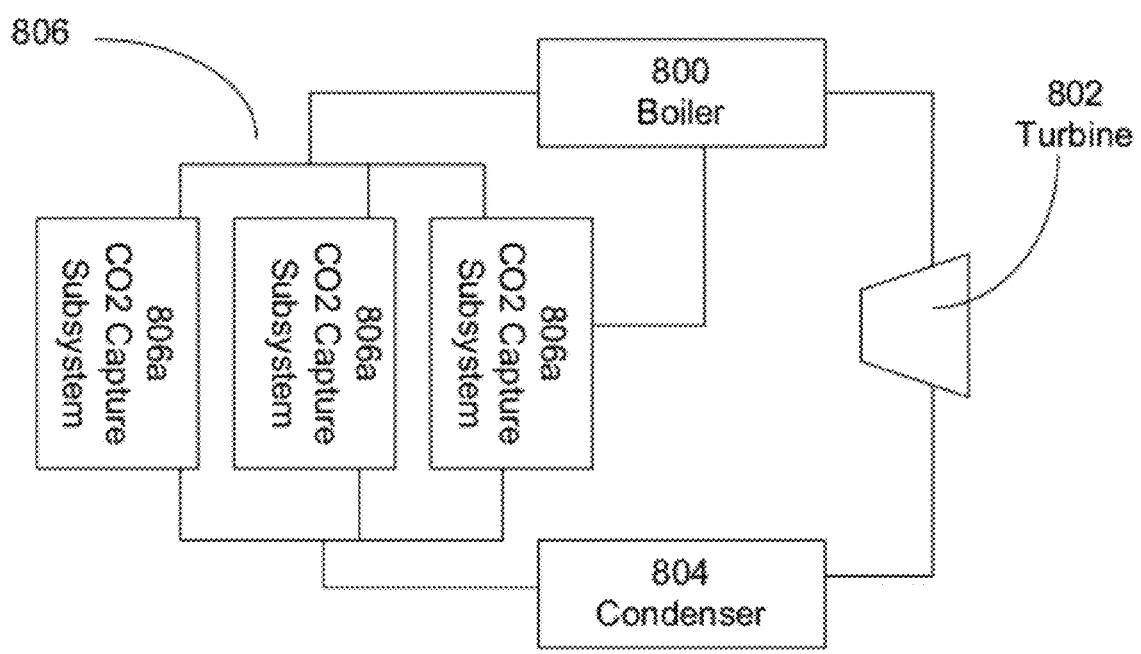
FIG. 8 illustrates an exemplary fossil fuel power generation plant using multiple carbon dioxide capture heat exchanges according to an exemplary embodiment of the present invention.

FIG. 8 is an illustration of a power generation plant using a plurality of carbon dioxide capture subsystems. Boiler 800 boils water to produce steam for turbine 802 to generate electricity. The spent steam/water from turbine 802 enters condenser 804 to be condensed into water. The condensed water is sent to carbon dioxide capture system 806 that comprises carbon dioxide capture subsystems 806*a*, *b*, and *c*. In order to increase the carbon dioxide capture time, subsystems 806*a*, *b*, and *c* can be configured to be in different states of the carbon dioxide sorption and desorption process. For example, subsystem 806*a* can be placed in an online mode wherein subsystem 806*a* is actively sorbing carbon dioxide from the flue gas exhaust of boiler 800.

Subsystem 806*b* can be in a desorption mode in which hot fluid is introduced into subsystem 800*b* to heat the sorbent material of subsystem 806*b* to cause desorption of carbon dioxide from subsystem 806*b*. Subsystem 806*b* can also be in an initial gas removal phase or secondary gas removal phase if the carbon dioxide has already been desorbed and is in a state to be sequestered. Subsystem 806*c* can be placed in a standby mode. Standby mode is an interim or intermittent mode between an online mode and a desorption mode. To ensure that carbon dioxide capture continually occurs, subsystem 906*c* can be placed into an online mode prior to taking subsystem 806*a* offline and being placed into a desorption mode.

Figure 9:
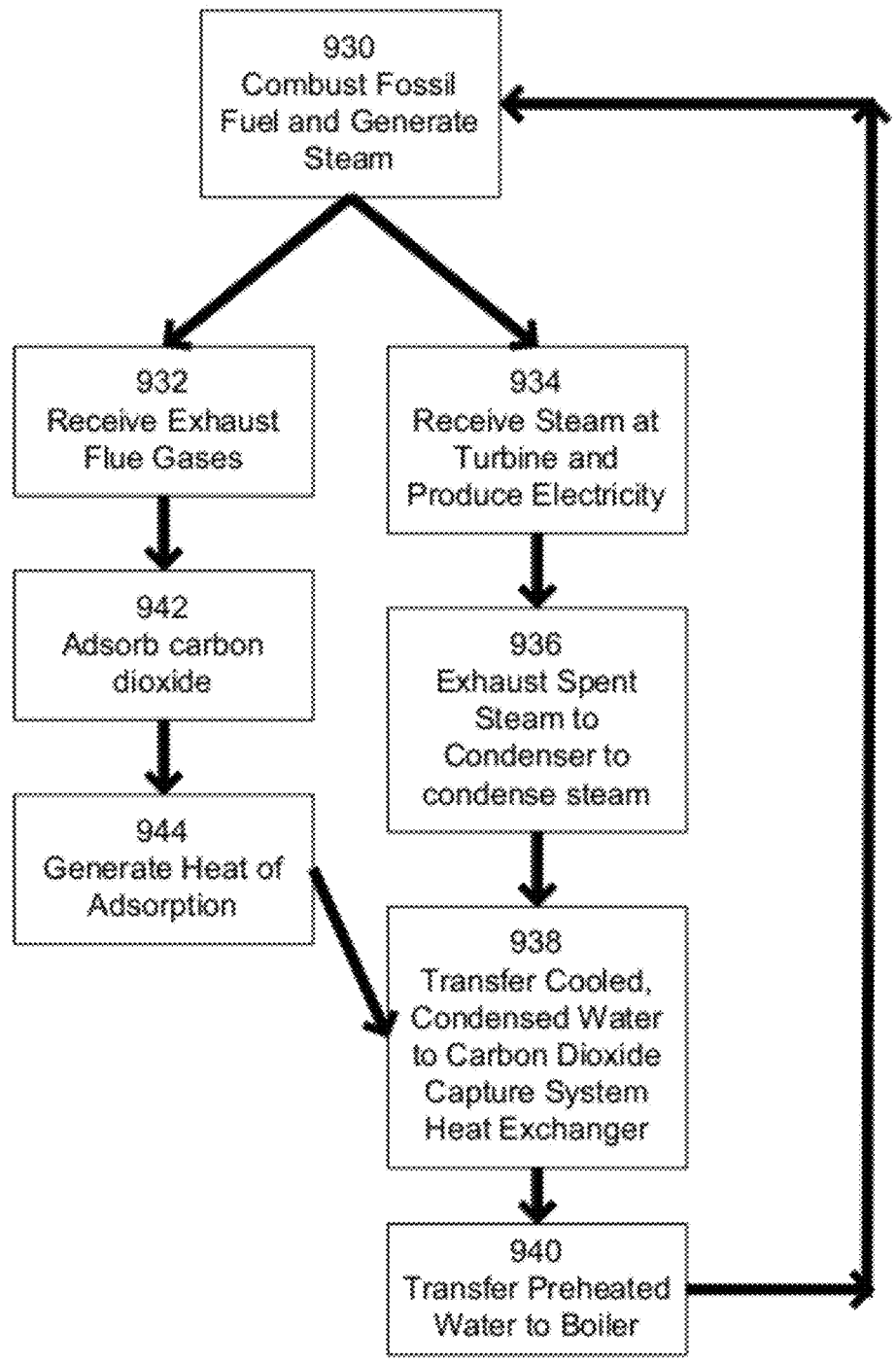
FIG. 9 is an exemplary method for using carbon dioxide capture to preheat a liquid in a fossil fuel power generation plant.

FIG. 9 is an exemplary process and method for reusing and recycling the heat generated during the sorption process in a power generation cycle. At step 930, a fossil fuel combusts to produce heat for boiling water and to turn the water into a high pressure, high temperature steam. As in typical power generation cycles, the high pressure and high temperature steam is received 934 at a turbine and electricity is produced. The turbine extracts the energy from the steam and exhausts 936 the spent steam to a condenser. The condenser condenses the steam into cooled, condensed feedwater, which is then transferred 938 to a carbon dioxide capture system.

A byproduct of the combustion process of step 930 is carbon dioxide and is exhausted as flue gas. The carbon dioxide capture system receives 932 the flue gas and it is adsorbed (or absorbed, depending on the sorption material used) 942. This sorption process generates 944 heat in the form of heat of adsorption. This heat is transferred to the cooled, condensed feedwater produced in step 938. The heat is used to increase the temperature of the feedwater to produce preheated feedwater. The preheated feedwater is then transferred 940 to the boiler to continue the process.

While the present disclosure has been described in connection with a plurality of exemplary embodiments, as illustrated in the various figures and discussed above, it is understood that other similar embodiments can be used or modifications and additions can be made to the described embodiments for performing similar functions of the present invention without deviating therefrom. Therefore, the present invention should not be limited to any single embodiment, but rather construed in breadth and scope in accordance with the following claims.

What is claimed is:

1. A power generation system comprising;
   a boiler system comprising:
      a combustion chamber for combusting one or more fossil fuels to produce combustion heat and a flue gas comprising a component to be sorbed; and
      a steam generation chamber receiving the combustion heat from the combustion chamber and applying the combustion heat to water to produce steam at a first temperature and a first pressure;
   a turbine receiving the steam from the steam generation chamber of the boiler system, wherein the turbine outputs spent steam having a second temperature and a second pressure, wherein the second temperature and the second pressure are lower than the first temperature and the first pressure;
   a condenser condensing the spent steam from the turbine, wherein the condenser outputs a feedwater stream having a third temperature lower than the second temperature; and
   a component capture system that receives as an input the feedwater stream having the third temperature and the flue gas comprising the component to be sorbed, wherein the component capture system comprises a sorbing media that:
      sorbs at least a portion of the component in the flue gas;
      generates sorption heat; and
      transfers at least a portion of the sorption heat to the feedwater stream having the third temperature to increase the temperature of the feedwater stream to a fourth temperature, wherein the feedwater stream having the fourth temperature serves as the water of the steam generation chamber of the boiler system to which the combustion heat is applied.

2. The power generation system of claim 1, wherein the component to be sorbed is carbon dioxide.

3. The power generation system of claim 1, wherein the sorbing media is selected from the group consisting of hollow fiber tubes containing zeolite, chilled ammonia, and one or more liquid amines.

4. The power generation system of claim 1, wherein the sorbing media comprises a hollow fiber tube comprising:
   a hollow inner core receiving at least a portion of the feedwater stream having the third temperature and outputting the feedwater stream having the fourth temperature;
   a zeolite packing disposed around the hollow inner core; and
   an impermeable membrane disposed between the hollow inner core and the zeolite packing to limit fluid flow from the hollow inner core to the zeolite packing.

5. The power generation system of claim 1, wherein the sorbing media is a plurality of hollow fiber tubes in a packed bed arrangement.

6. The power generation system of claim 1, wherein the component capture system comprises a plurality of component capture subsystems.

7. The power generation system of claim 6, wherein the plurality of component capture subsystems comprise a first component capture subsystem, a second component capture subsystem and a third component capture subsystem, each component capture subsystem independently operating in one or more of an online mode for sorbing at least a portion of the component in the flue gas, a desorption mode for desorbing at least a portion of the sorbed component, and a standby mode.

8. The power generation system of claim 7, wherein at least one of the plurality of component capture systems further comprises an inlet for introducing nitrogen gas during an initial gas removal phase after the desorption mode.

9. The power generation system of claim 6, wherein at least one of the plurality of component capture systems further comprise:
a first outlet for outputting a first output gas during an initial gas removal phase; and
a second outlet for outputting a second output gas during a secondary gas removal phase after the initial gas removal phase.

10. The power generation system of claim 9, wherein the second output gas has a higher component concentration than the first output gas.

11. The power generation system of claim 8, wherein the nitrogen gas increases an internal pressure of the at least one of the plurality of component capture subsystems to push at least a portion of the component desorbed out of the at least one of the plurality of component capture subsystems.

12. The power generation system of claim 1, wherein the component capture system further comprises a steam net to increase the temperature of the sorbing media to cause the sorbing media to desorb at least a portion of the sorbed component.

13. A process for generating power, the process comprising:
combusting one or more fossil fuels to produce combustion heat and a flue gas comprising a component to be sorbed;
producing steam having a first temperature and a first pressure using the combustion heat;
generating the power in the form of electricity from the steam having the first temperature and the first pressure to produce spent steam with a second temperature and a second pressure, wherein the second temperature and the second pressure are lower than the first temperature and the first pressure;
condensing the spent steam to produce low temperature feedwater; and
sorbing at least a portion of the component in the flue gas in a sorbing media to produce sorption heat, wherein the sorption heat is transferred to the low temperature feedwater to produce a preheated feedwater used to produce the steam having the first temperature and the first pressure.

14. The process of claim 13, wherein the component to be sorbed is carbon dioxide.

15. The process of claim 13, wherein the sorbing media is selected from a group consisting of hollow fiber tubes containing zeolite, chilled ammonia, and one or more liquid amines.

16. The process of claim 13, further comprising placing a first component capture subsystem in an online mode to sorb at least a portion of the component.

17. The process of claim 16, further comprising placing a second component capture subsystem in a desorption mode to desorb at least a portion of the component.

18. The process of claim 17, wherein placing the second component capture subsystem in the desorption mode to desorb the component comprises increasing a temperature of the at least a portion of the sorbing media using steam to cause the at least a portion of the sorbing media to desorb at least a portion of the sorbed component.

19. The process of claim 18, further comprising introducing nitrogen gas in an initial gas removal phase into the second component capture subsystem after the desorption mode.

20. The process of claim 19, further comprising opening a valve in a first position to output a first output gas during the initial gas removal phase and opening the valve to a second position for outputting a second output gas during a secondary gas removal phase after the initial gas removal stage.

* * * * *